United States Patent [19]
Deaver et al.

[11] Patent Number: 5,802,129
[45] Date of Patent: Sep. 1, 1998

[54] MECHANICALLY JOINED REPLACEMENT SHROUD FOR BOILING WATER NUCLEAR REACTOR

[75] Inventors: Gerald A. Deaver; Barry H. Koepke, both of San Jose, Calif.

[73] Assignee: General Electric Company, Schenectady, N.Y.

[21] Appl. No.: 584,544

[22] Filed: Jan. 11, 1996

[51] Int. Cl.⁶ .................................................. G21C 15/00
[52] U.S. Cl. .......................... 376/287; 376/302; 376/461
[58] Field of Search .............................. 376/287, 302, 376/461

[56] References Cited

U.S. PATENT DOCUMENTS

| | | | |
|---|---|---|---|
| 5,402,570 | 4/1995 | Weems et al. | 376/302 |
| 5,502,754 | 3/1996 | Erbes | 376/302 |
| 5,538,381 | 7/1996 | Erbes | 376/302 |

*Primary Examiner*—David D. Wasil
*Attorney, Agent, or Firm*—Nixon & Vanderhye, P.C.

[57] ABSTRACT

In a pressure vessel of a nuclear reactor containing a core assembly enclosed within a core shroud, the core shroud spaced radially inwardly of a pressure vessel wall, with an annular shroud support plate fixed to the pressure vessel wall, wherein a lower end of the shroud is seated on an upper edge of the support plate to create a joint interface further wherein, and a plurality of brackets are secured between the shroud and the shroud support plate, spanning the joint interface.

12 Claims, 4 Drawing Sheets

MECHANICALLY JOINED REPLACEMENT SHROUD FOR BOILING WATER NUCLEAR REACTOR

TECHNICAL FIELD

This invention relates to boiling water nuclear reactors and specifically, to a replacement shroud in an existing boiling water nuclear reactor power plant.

BACKGROUND

Typical boiling water nuclear reactors include a reactor assembly which consists of the reactor vessel and its internal components including the core, core shroud, top guide assembly, core plate assembly, steam separator and dryer assemblies, and jet pumps. Also included the reactor assembly are the control rods, control rod drive housings and the control rod drives.

The reactor vessel is a generally cylindrical pressure vessel with a single full diameter removable head. The shroud is a cylindrical stainless steel structure located within the pressure vessel, and which surrounds the core thereby providing a barrier to separate the upward flow through the core from the downward flow in the annular space between the pressure vessel wall and the core shroud. The core shroud supports the weight of the top guide, core plate and shroud head along with attached steam separators.

The discovery of unexpected circumferential cracks propagating through the thickness of the shrouds in relatively young operating boiling water nuclear reactors has prompted a redesign of the core shrouds for future boiling water reactors, as well as the design of replacement shrouds for existing damaged shrouds.

When cracking of the shrouds circumferential and/or vertical welds becomes large enough, repair is necessary to assure the structural integrity of the shroud under all plan operating conditions. Repairs to the shroud must assure alignment of the core in order to insert control rod blades for safe shutdown, provide a barrier to keep the core flooded into direct flow to the core, provide a structural support for the top guide and core plate, and a horizontal support for the fuel rods. For a shroud replacement design, all of these functions must also be accomplished. Replacement shroud techniques are described in commonly owned U.S. Pat. Nos. 5,519,744 and 5,583,899.

The challenge for a bolted mechanical replacement shroud design is to minimize bypass leakage through a mechanical connection, while at the same time, provide enough structural integrity to withstand the plant design loadings. While the use of bolting is a common practice, the geometry and specific method of accomplishing the bolted connection in accordance with this invention is unique. In this case, machining of the beveled support plate (on which the shroud rests) under 75 feet of water with ultra-high pressure cutting equipment has never been accomplished to the best of our knowledge.

DISCLOSURE OF THE INVENTION

The principal object of this invention is to replace an existing core shroud structure by bolting a new replacement shroud to the existing shroud support plate. In doing so, it is necessary to create a connecting surface configuration on the existing shroud support prior to installing the new shroud structure, and to then provide suitable mechanical brackets and fasteners to secure the new shroud to the shroud support.

In an exemplary embodiment of the invention, a plurality of J-hook brackets are utilized to secure the new replacement shroud to a shroud support plate, while preventing any lifting or other undesirable movement of the replacement shroud structure. The J-hook brackets hook onto the lower rim of the existing shroud support plate at locations which are between the vertical stilts in the existing shroud support. The upper end of the bracket attaches to the new shroud by using bolts which are secured through a flange in the new shroud. The bolts employ spherical washers to maintain alignment and to minimize bending moments in the bolts. The connection between the existing shroud support and the new replacement shroud includes a V-shaped connection which provides leakage resistance from the contact provided by the angled sides of the connection, and provides a resistance to shear loads and motion of the shroud. In addition, the alignment of the new brackets and bolting hardware provides a means of applying only compressive loads on the existing shroud support which is important to prevent the recurrence of intergranular stress corrosion cracking.

In accordance with the broader aspects of the invention, there is provided a pressure vessel for a nuclear reactor containing a core assembly enclosed within a core shroud, the core shroud spaced radially inwardly of a pressure vessel wall, with an annular shroud support plate fixed to the pressure vessel wall, wherein a lower end of the shroud is seated on an upper edge of the support plate to create a joint interface further wherein, and a plurality of brackets are secured between the shroud and the shroud support plate, spanning the joint interface.

Additional objects and advantages will become apparent from the detailed description which follows.

BEST MODE FOR CARRYING OUT THE INVENTION

Figure 1:
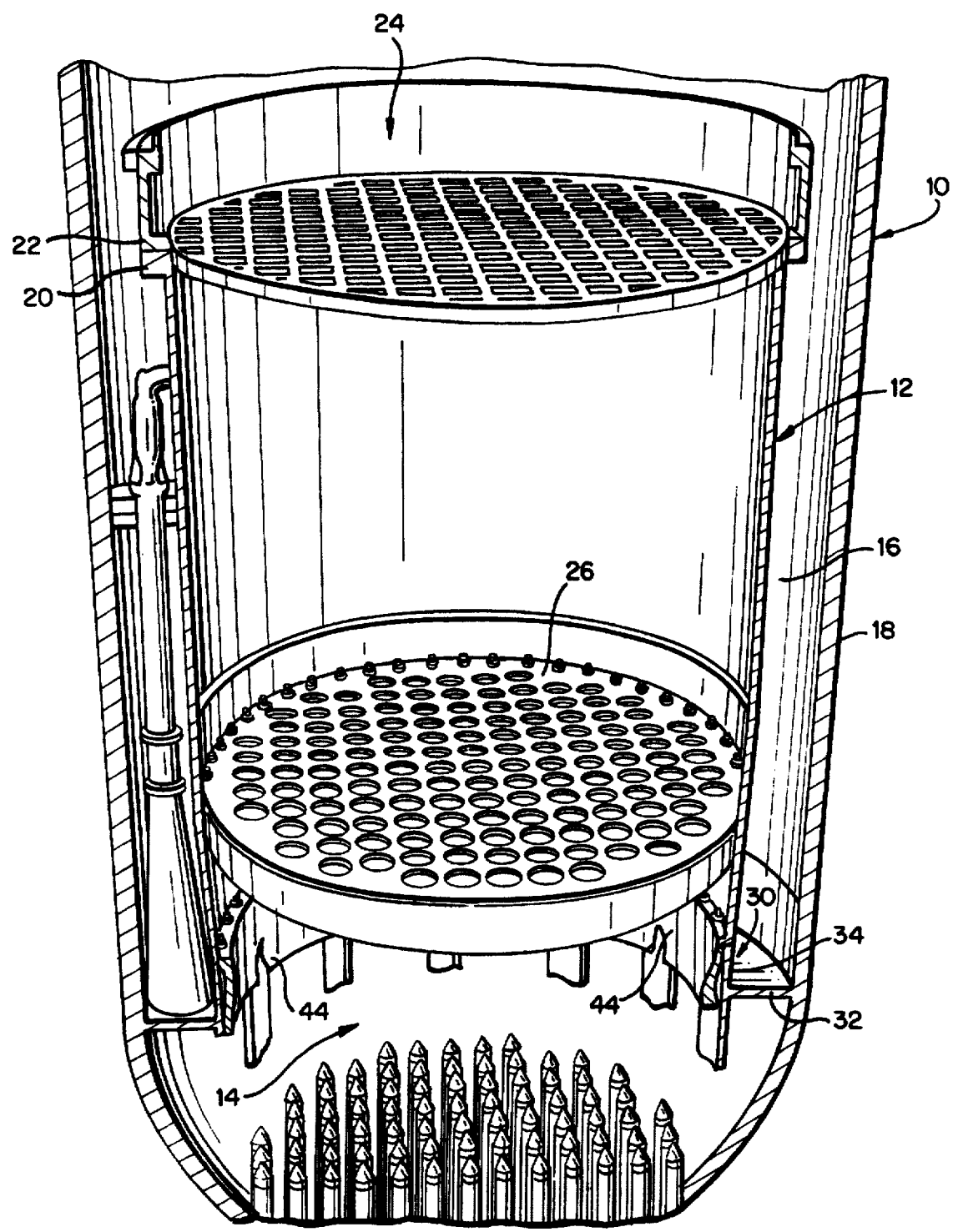
FIG. 1 is a partial cut-away perspective of a boiling water nuclear reactor core (with fuel rods removed) in accordance with the invention.
Figure 2:
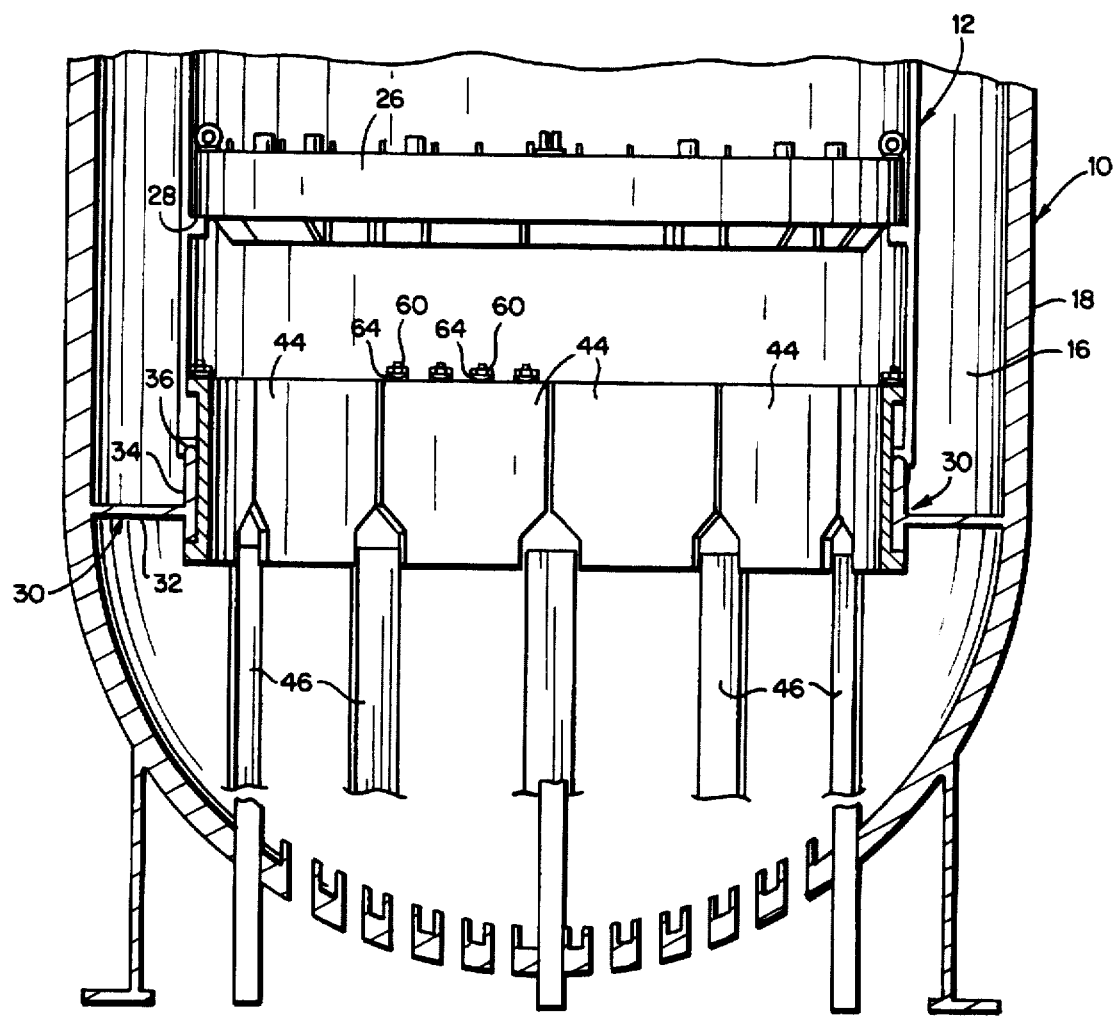
FIG. 2 is a part side section of the reactor shown in FIG. 1.

FIGS. 1 and 2 illustrate those internal components of a boiling water nuclear reactor which are relevant to this invention. More specifically, the pressure vessel 10 encloses a core shroud 12. The shroud 12 is typically a substantially cylindrical, stainless steel structure which surrounds the reactor core (indicated generally at 14 but note that the fuel rods have been omitted for the sake of clarity) and which provides a barrier to separate the upward coolant flow through the core 14 from the downward flow in the annular space 16 between the shroud 12 and the reactor vessel wall 18. The upper end of the shroud 12 is formed with a flange 20 which mates with a flange 22 of a top guide 24 which supports a steam separator assembly (not shown) in conventional fashion. The manner in which the top guide is bolted to the flange 20 forms no part of this invention and need not be described in any further detail.

The core shroud 12 also supports a core plate 26 by means of a radially inwardly directed flange 28 (FIG. 2) located in the lower half of the shroud. Here again, the manner in which the core plate 26 is secured to the shroud is conventional and forms no part of this invention.

Figure 3:
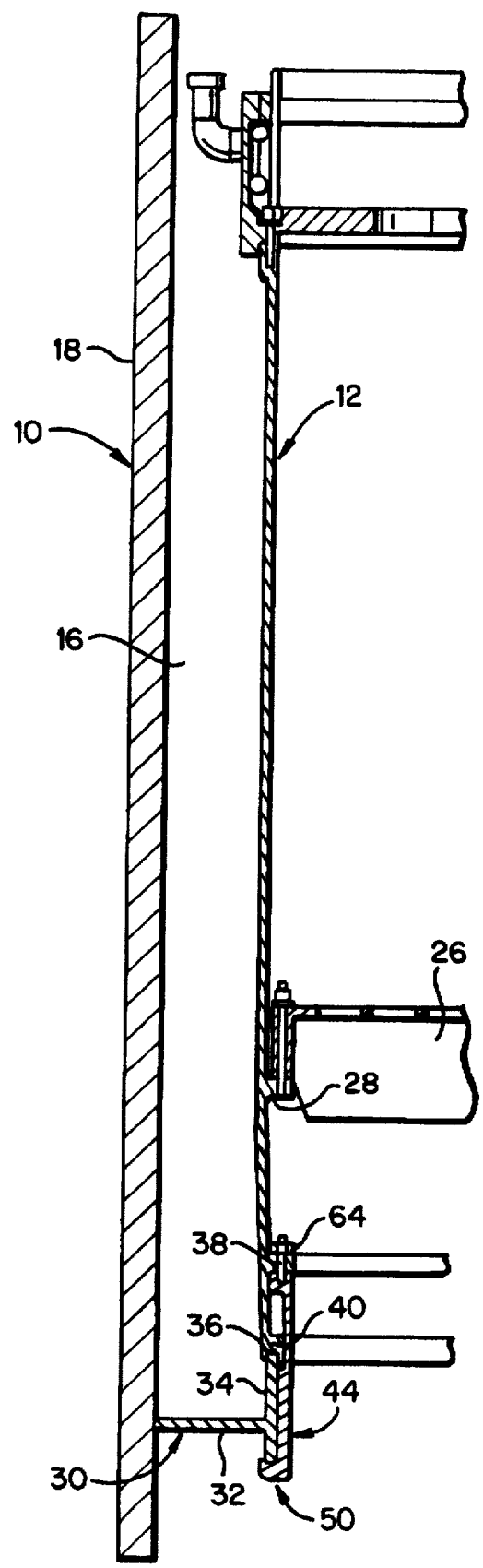
FIG. 3 is a partial side section of the interconnection between the replacement shroud and the shroud support plate in accordance with this invention.

The lower end of the shroud 12 is seated on an annular shroud support plate 30 which is welded to the inside of the vessel wall 18. The plate 30 includes a horizontal ring portion 32 and a vertical support portion 34 having a tapered end 36 best seen in FIGS. 3 and 4. The lower end of the shroud 12 is formed with a pair of radially inwardly directed flanges 38 and 40. The lower flange 40 is formed with an annular groove 42 shaped and sized to fit over the tapered end 36 of the plate 30. Thus, the shroud 12 is fully seated (about the full 360° circumference thereof) on the vertical support portion 34 of the plate 30. The end 36 of the shroud support is tapered after removal of the original or predecessor shroud in order to create the mating fit with groove 42.

The shroud 12 is secured to the plate 30 by a series of lower J-brackets 44 (twelve in the exemplary embodiment) which span the joint between the shroud flange 40 and the vertical support portion 34, internally of the shroud.

With reference to FIGS. 1 and 2, the lower brackets 44 each comprise segment of a cylinder, all twelve brackets when assembled, forming a substantially closed support sleeve or cylinder, best seen in FIG. 2. The brackets 44 are cut out at lower ends thereof so that adjacent brackets can accommodate vertical stilts 46 which support the plate 30.

Figure 4:
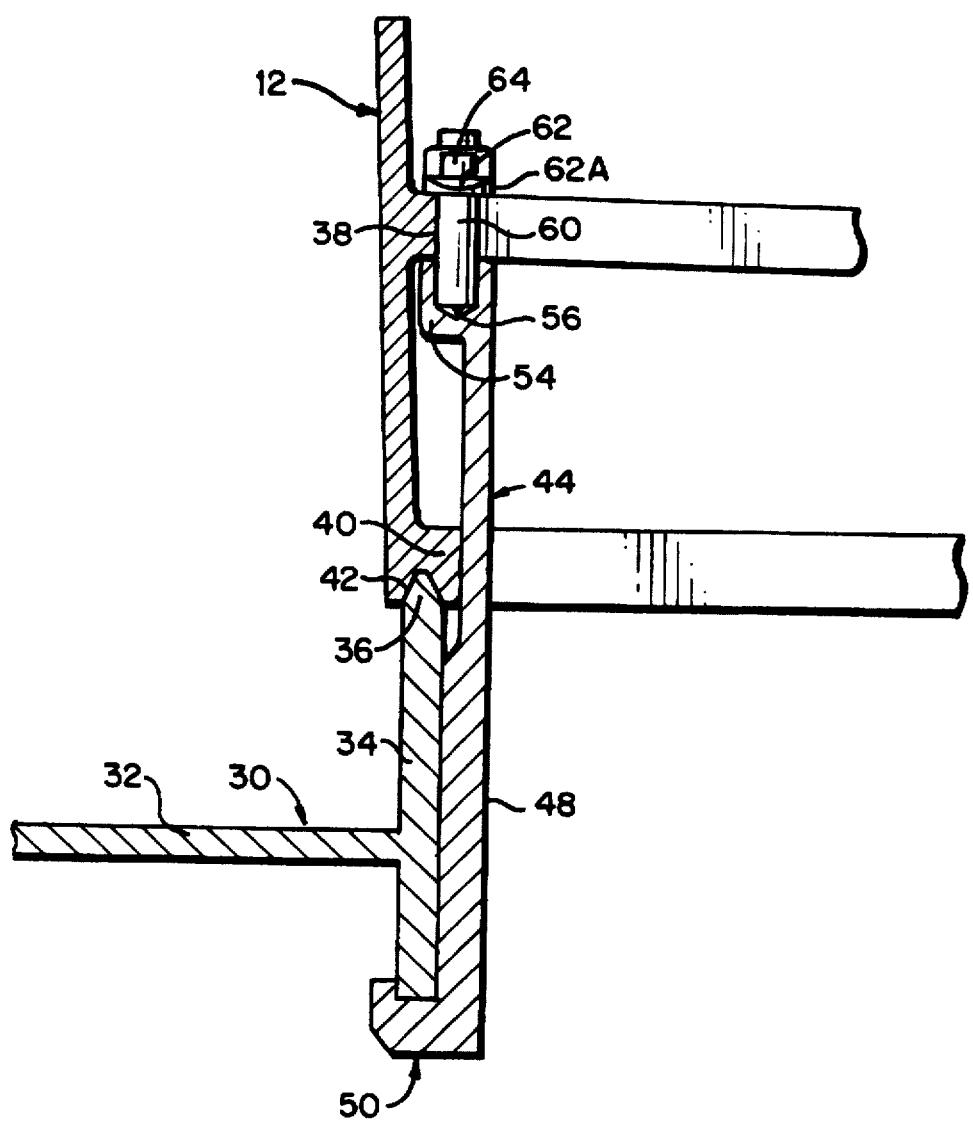
FIG. 4 is an enlarged detail taken from FIG. 3.

Since each bracket 44 is similar to the next, only one need be described in detail. With reference also to FIG. 4, each J-bracket 44 includes a vertical web 48 formed with a radially outwardly directed flange (or hook) 50 which includes a groove 52 sized and shaped to mate with (and receive) the lower end of the vertical support portion 34 of plate 30. The web portion 48 has increased thickness in the area which abuts the vertical support portion 34, below the shroud flange 40. The upper end of the vertical web 48 of the J-bracket 44 is formed with a radially outwardly directed flange 54 formed with a plurality of blind, threaded bolt holes 56 (4 in the exemplary embodiment) which are vertically aligned with bolt holes 58 formed in the shroud flange 38. In other words, bracket flange 54 fits under the shroud flange 38 as best seen in FIG. 4, with four bolt holes in the shroud flange 38 aligned with the same number of bolt holes in the J-bracket flange 54.

Holes 56 in the J-bracket 44 are threaded and each receives a stud 60 which projects upwardly through the smooth bore holes 58. A pair of spherical washers 62, 62A are located on the stud 60, and then a nut 64 is tightened down to a desired torque. In the exemplary embodiment, four such studs 60 are employed for each bracket segment (one set shown in FIG. 2).

To locate each J-bracket 44 on assembly, the bracket is initially located such that the bottom of bracket flange 54 lies adjacent the top of shroud flange 40. Then, the J-bracket 44 is pulled upwardly so that studs 60 extend through holes 58 and groove 52 receives the lower end of the vertical support portion 34 of plate 30. The nuts 64 (and washers 62, 62A) are then applied and tightened.

This arrangement meets the stated objectives of minimizing coolant leakage at the shroud/shroud support plate interface, while ensuring enough structural margin to withstand the plant design loadings.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a pressure vessel of a nuclear reactor containing a core assembly enclosed within a core shroud, the core shroud spaced radially inwardly of a pressure vessel wall, supported by an annular shroud support plate, the improvement wherein a lower end of the shroud is seated on an upper annular edge of the support plate to create a joint interface therebetween; and a plurality of brackets at a lower end of said shroud are secured between the lower end of the shroud and the shroud support plate, spanning the joint interface.

2. The improvement of claim 1 wherein each bracket is secured at a lower end thereof to a lowermost edge of said shroud support plate and at an upper end thereof to a radial flange formed on the lower end of the shroud.

3. The improvement of claim 2 wherein the lower end of each bracket is formed with a radially outwardly directed hook which engages said lowermost edge of said shroud support plate.

4. The improvement of claim 3 wherein the upper end of each bracket is bolted to said radial flange.

5. The improvement of claim 1 wherein each bracket is secured to the shroud by a plurality of bolts.

6. The improvement of claim 1 wherein each bracket includes a plate having connection flanges at opposite ends thereof.

7. The improvement of claim 6 wherein said plate has axial portions of different thickness between said flanges.

8. The improvement of claim 4 wherein each bracket is bolted to said radial flange by a plurality of bolts.

9. The improvement of claim 1 wherein twelve brackets are arranged about the support plate, forming a substantially closed cylinder.

10. The improvement of claim 9 wherein each bracket is mechanically hooked at a lower end to a lower edge of the shroud support plate and bolted at an upper end to the shroud.

11. The improvement of claim 1 wherein the lower end of the shroud is formed with a tapered annular edge, and wherein the upper edge of the support plate is formed with an annular groove in which said annular tapered edge is seated.

12. The improvement of claim 1 wherein the core shroud is a replacement shroud.

* * * * *